United States Patent [19]
Savall et al.

[11] Patent Number: 5,160,705
[45] Date of Patent: Nov. 3, 1992

[54] APPARATUS FOR FLUIDIZING GRANULAR MATERIAL

[75] Inventors: Vincent Savall, Velizy Villacoublay; Francois-Xavier Ball, Chatou, both of France

[73] Assignee: Degremont, Rueil-Malmaison, France

[21] Appl. No.: 543,489

[22] Filed: Jun. 26, 1990

[30] Foreign Application Priority Data

Jun. 30, 1989 [FR] France ............... 89 08818

[51] Int. Cl.⁵ ............... F27B 15/08; B01J 8/18
[52] U.S. Cl. ............... 422/140; 422/139; 422/143; 435/287
[58] Field of Search ............... 422/139, 140, 143; 435/287; 122/40; 110/245; 34/57 A; 55/319

[56] References Cited

U.S. PATENT DOCUMENTS 3,855,120 12/1974 Garbo .................. 210/3
4,529,423 7/1985 Johnson ............... 55/319 X

FOREIGN PATENT DOCUMENTS 154334 3/1985 European Pat. Off. .
3312579 10/1984 Fed. Rep. of Germany .
3401616 7/1985 Fed. Rep. of Germany .

Primary Examiner—Robert J. Warden
Assistant Examiner—Amalia Santiago
Attorney, Agent, or Firm—Pollock, Vande Sande & Priddy

[57] ABSTRACT

A device for the introduction of a liquid in a medium containing granulate material for the fluidization of this material, intended more particularly for equipping reactors such as those used for the biological treatment of aqueous effluents, characterized in that it is made of a part, bearing on the bottom of the reactor, the upper portion of said part cooperating with the liquid injection tube so as to create a flow with a very small turbulence of the liquid at the tube outlet and the shape of which being such that it provides, at all points of the apparatus, without dead zones, the setting in movement of the material to be fluidized.

4 Claims, 2 Drawing Sheets

APPARATUS FOR FLUIDIZING GRANULAR MATERIAL

FIELD OF THE INVENTION

The present invention relates to a device for the introduction of a liquid in a medium formed of a granular material, for the fluidization of this material.

The invention is provided for being applied, more particularly but of course not exclusively, to the fluidization of granular materials used in apparatus (reactors) serving for the treatment of waters, particularly for the biological treatment of aqueous effluents, such as fluidized bed methanization reactors, etc.

BACKGROUND OF THE INVENTION

The fluidization quality in a reactor resides in obtaining a distribution which is as perfect as possible of the fluidization liquid at the base of the reactor, while avoiding the formation of dead zones or preferential passages.

If these conditions are easy to meet for apparatus of small surface area (for example less than 1 sq. meter) at acceptable costs, the same does not apply to apparatus of a large surface area and when the liquid contains materials in suspension which might block the distribution system.

In the case of filters, one often uses perforated floors which allow fluidizing the filtration material, with a view for example to sort it again after washing.

The device which is the most often used is a distribution system including a general collector in which are fixed branches including in turn distribution openings possibly fitted out with strainers. These devices can be immersed inside a layer of a non fluidized material in order to improve the distribution and/or prevent, when at rest, the solids to be fluidized from coming in contact with the distribution openings.

Such techniques are used for example in ion exchange reactors, or in fluidized bed methanization reactors.

A device of the type previously described but in which the branches extend through the reactor walls has also been proposed, and in order to suppress at best the dead zones, there is provided a filling body between each branch.

All these devices include many points of distribution per unit of surface and have the disadvantage of presenting, inside the reactor on a same branch, several points of distribution, the clogging-up state of which is difficult to control, either in operation or after an incident which might have caused a penetration of the material to be fluidized in the branches.

This concept might cause a degradation of the fluidization which can be remedied only after a delicate and costly discharge of the material to be fluidized.

On the other hand, it is not always possible to obtain with such devices a good compromise between fluidization flow rate, the number of points of distribution per unit of surface, the distribution energy and the diameter of the distribution opening, as a function of the various applications.

OBJECTS AND SUMMARY OF THE INVENTION

The invention not only eliminates these disadvantages, but allows also distributing in optimum conditions the fluidization liquid by means of a fewer number of injection points than those of the known systems or devices, hence resulting in less clogging-up and the possibility of using a fluidization liquid containing impurities. Moreover, the device according to the invention can be easily the object of a hydraulic intervention, thereby allowing acting directly so as to remedy a faulty operation whatever its cause.

The device according to the invention is characterized in that it is made of a part, bearing on the bottom of the apparatus, the upper portion of said part cooperating with the liquid injection tubes so as to create a flow without any useless turbulence of the liquid and the shape of which being such that it provides, at all points of the apparatus, while minimizing the dead zones, the movement of the material to be fluidized.

The various features of the invention will become more apparent from the following description of one of its possible embodiments, it being made clear that it is only meant to be a non limiting example and that all other shapes, proportions and dispositions could be adopted without departing from the scope of the invention.

BRIEF DESCRIPTION OF DRAWINGS

During this description, reference will be made to the accompanying drawings wherein:

FIG. 1a is a partial view of a variant thereof;

DETAILED DESCRIPTION OF THE INVENTION

Figure 1:
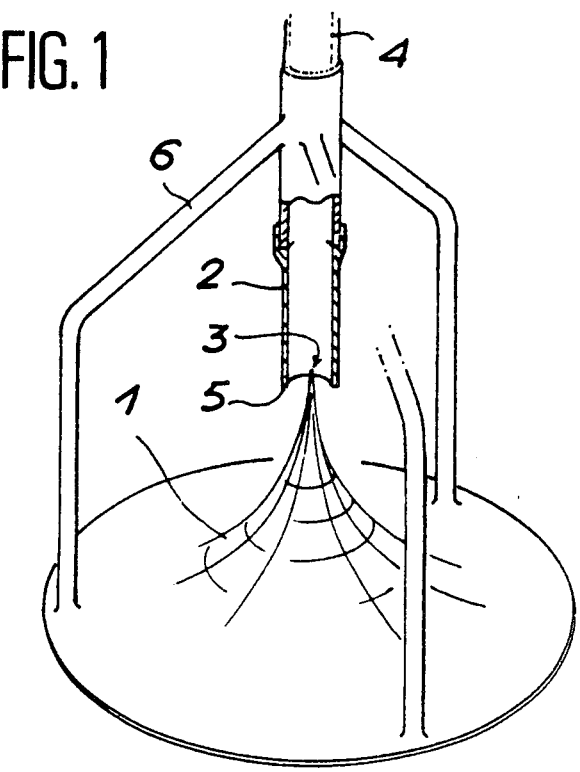
FIG. 1 is a general view of the device.
Figure 1:
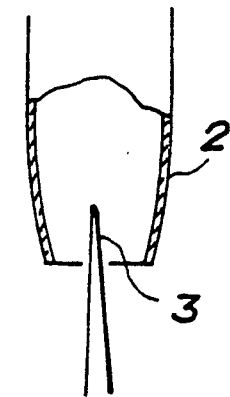

The device according to the invention consists in a part 1, placed in the bottom of the apparatus, made of a solid of revolution, the generating lines of which have a curvature allowing guiding the liquid with a minimum of turbulence, facilitating its progression on the bottom of the apparatus, at sufficient radial distances of the injection axis, while allowing a movement of the fluid to be fluidized.

In the example treated, part 1 is in the shape of a cone the top 3 of which, very elongated, extends along its axis in the injection tube 2 so as to create an annular space 5 through which flows the fluidization liquid in the reactor, without creating turbulence. The shape and relative positioning of parts 1 and 2 allow a flow to be obtained without separation of the fluid streams from the walls of part 1 and recovering the kinetic energy released at the end of the injection tube in order to transfer fluid velocity at a large distance.

Due to the suppression of the turbulence at the injection point, the device eliminates the abrasion problems, in the case of fluidization of particles the material of which possess abrasive qualities.

The injection tube 2 is fixed to a feeding tubing 4. It is supported and centered by several support arms 6, and is thereby made integral with part 1.

For obtaining the best centering during operation, the injection tube 2 is advantageously made of a flexible material, thereby allowing eliminating some centering error, the local pressure at 5 due to the flow of the fluidization liquid providing under such conditions for a self-centering of tube 2 about part 1.

According to the characteristics of the material to be fluidized, it is advantages to provide the end of injection tube 2 with a slightly conical shape, as shown in FIG. 1a.

The tubing 4 is connected to a distribution source 9 which is outside the apparatus.

This tubing includes moreover an isolating and setting valve 7 as well as a branch provided with a valve 8 for its connection to control elements, a pressure gauge for example, so as to check the right operation of the device and to carry out other operations, such as for example the injection of a secondary fluid, and the bleeding of pipe 4, for unclogging the device should an operation incident occur.

Figure 3:
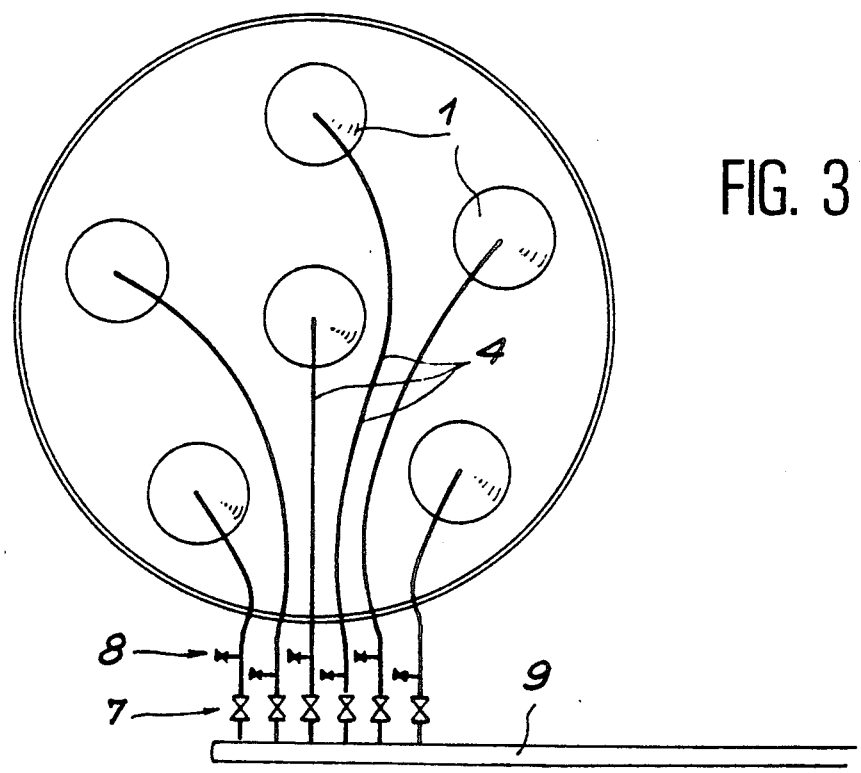
FIG. 3 is a plan view of the installation in a circular enclosure of a plurality of devices according to the invention.

In FIG. 3 is shown an assembly of 6 injection heads installed in the example of this Figure on the bottom of a cylindrical enclosure. It is easy to see that one can easily control each injection head independently from the others.

The fluidization quality of a particulate solid by a liquid can be assessed by measuring the pressure losses to which the liquid is subjected when flowing through the solid medium in consideration.

Indeed, it is well known that when a liquid provides for the complete fluidization of a given quantity of a solid, this liquid is subjected, when flowing through the solid, to a pressure loss corresponding to the force required for counterbalancing the apparent weight of the solid in the fluidization liquid. The fluidization curve of a given material shows the evolution, aa a function of the ascending speed of the fluidization liquid, of the pressure losses of this liquid when flowing through the material. This curve allows comparing, everything being otherwise equal, the efficiency of the various fluidization devices of a solid by a liquid.

This being established, the device according to the invention has been compared with a known device made of a distribution grid with perforated branches. Comparative tests have been run on a real scale by using a cylindrical reactor of a surface of 1 sq. meter containing 3.5 cubic meters of a solid to be fluidized.

Figure 2:
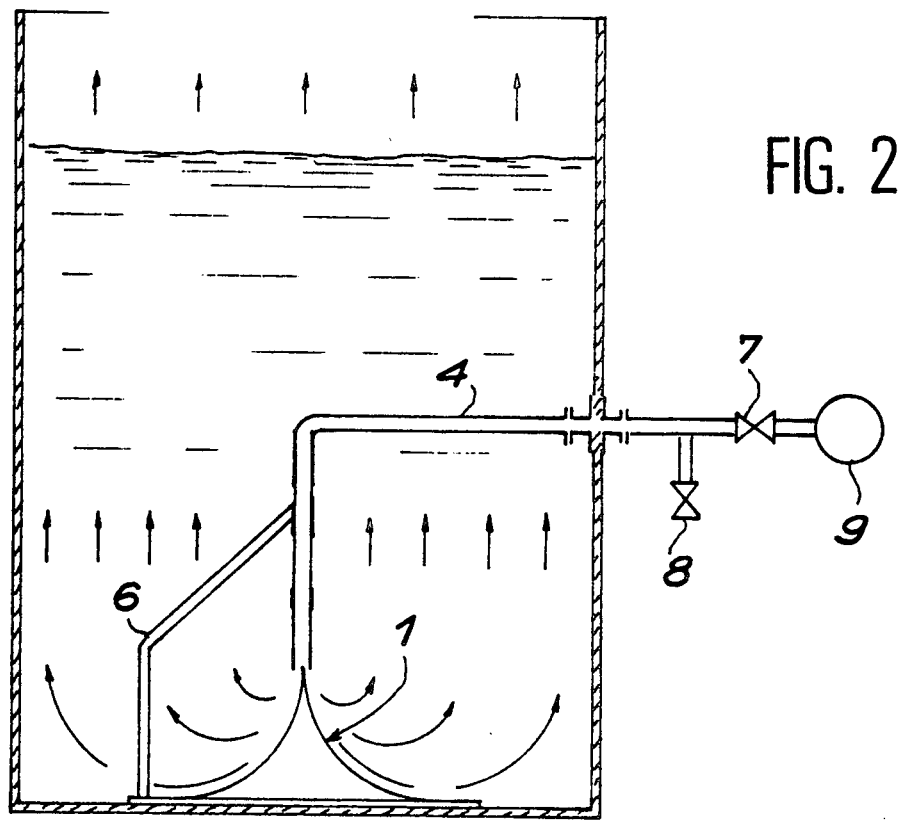
FIG. 2 is a sectional elevation view of a reactor showing the connection of the device to its liquid feeding system.

The reactor has been fitted out on the one hand with a device according to the invention and shown in FIG. 2, with a single injection point, and on the other hand with a branched distribution grid including 12 injection openings directed downwardly and placed so as to cooperate each with a same apparatus surface.

The solid to be fluidized had an effective size of 0.2 mm and a specific fluidization energy in water of 2 W/cubic meter about, corresponding a pressure loss of 0.3 meter of a column of water for each meter in height of the material.

Figure 4:
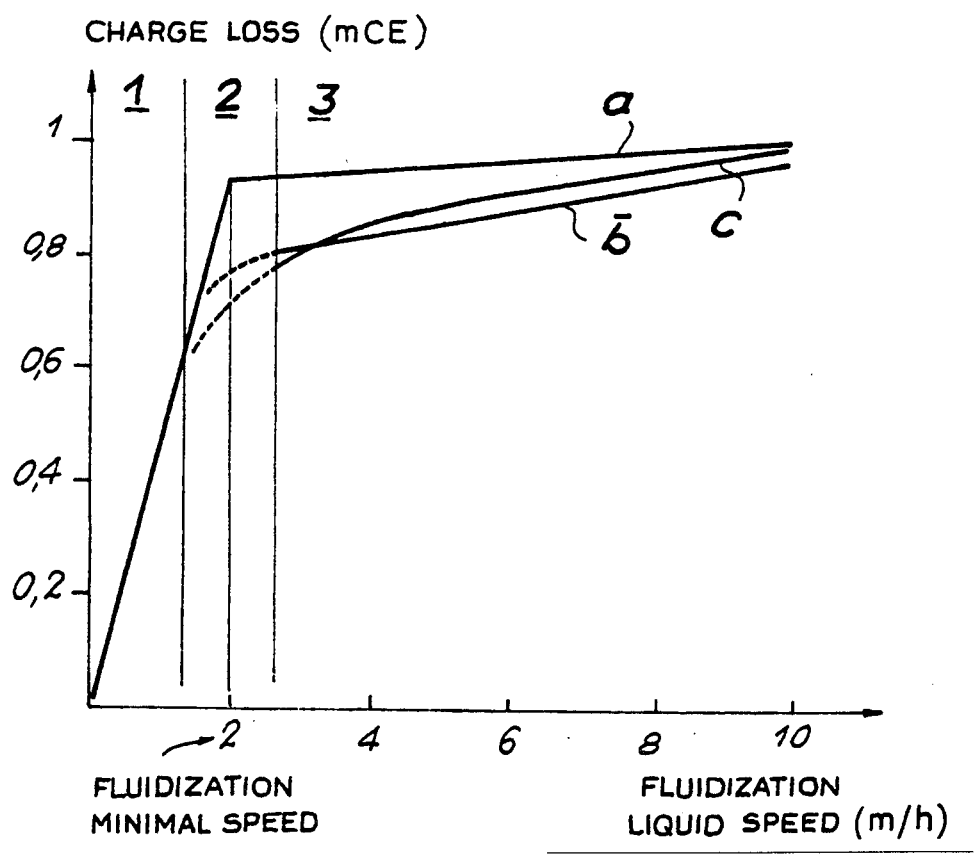
FIG. 4 shows by means of a family of curves the results obtained by the invention.

FIG. 4 shows the fluidization curves obtained with this example, viz. the pressure loss in the bed itself which is measured after the injection device.

Curve a is the ideal fluidization curve, obtained from measurements made on a column of small diameter the size of which allows providing a perfect fluidization, which the transparency of the column allows to control.

Curves b and c characterize respectively the fluidization obtained with the perforated grid (curve b) and by means of the device according to the invention (curve c). Three zones can be distinguished on these curves:

The first (1), strongly ascending, corresponds to speeds of the liquid such that the latter flows through the solid particles without fluidizing them.

The second (2) is a transition zone, unstable and badly defined for the non-ideal systems, which marks the beginning of the fluidization.

The third zone (3) corresponds to the fluidization as such of the solids. In this region, the slope of the fluidization curve reflects the influence of the granulometric dispersion of the solid on the liquid charge losses. The slopes of the non ideal curves (b and c) which are more marked are moreover due to the existence of dead zones of the non fluidized material.

The so-called minimum fluidization speed corresponds to the meeting point of the first and last of these zones, it being observed that in the ideal curve (a), there is no zone (2).

It is well-known that in the fluidization industrial reactors of a solid, the liquid ascensional speeds used are in general between values equal to 2 and 6 times the minimum fluidization speed (normally 3 and 4 times) for ensuring a stable operation speed in apparatus of moderate height.

When examining FIG. 4, one sees that the fluidization quality obtained with the device according to the invention is better than that obtained with the known device as soon as the liquid reaches speeds corresponding to the hereabove mentioned operation practical zone.

Although the number of injection points is in the example 12 times less important, the device according to the invention ensures globally a better distribution of the liquid and a better use of the released hydraulic energy.

This device applies to any reactor in the industry in which a method using the fluidization technique of a solid by a liquid is practiced.

We claim:

1. Apparatus for fluidizing granular material contained in a vessel, said apparatus comprising:

a vessel including a bottom wall, a liquid injection tube means mounted within said vessel for introducing fluidizing liquid into said vessel, said injection tube means having a central axis; and, liquid flow directing means for directing the flow of fluidizing liquid as said liquid is introduced into said vessel, said liquid flow directing means comprising:

a) a lower base portion for supporting said flow directing means on the bottom wall of said vessel;

b) an upwardly-extending flow-directing portion integral with said base portion and comprising a surface of revolution having an outwardly concave surface extending upwardly from said base portion to a vertically elongated top portion, said top portion extending into said injection tube means along the axis of said tube means, thereby creating an annular space between said injection tube means and said top portion through which fluidizing liquid can flow and equalize energy released into said vessel by the introduction therein of said fluidizing liquid, said injection tube means being secured to feeding pipe means for introducing fluidizing liquid into said injection tube means, and said feeding pipe means being attached to at least one support arm secured to said base portion.

2. Apparatus according to claim 1 wherein said liquid injection tube means is formed of a flexible material.

3. Apparatus according to claim 1 wherein said liquid injection tube means is provided with a liquid injection end portion having a converging portion shaped to direct the fluidizing liquid towards the axis of said tube means.

4. Apparatus according to claim 1 wherein said feeding pipe means is connected to an outside source for distributing fluidizing liquid and includes valve means for controlling the flow of said liquid through said feeding pipe means.

* * * * *